Aug. 1, 1944.  W. K. BERTHOLD  2,355,036
GLASSWARE TRANSFERRING AND CONVEYING APPARATUS
Filed Feb. 17, 1941
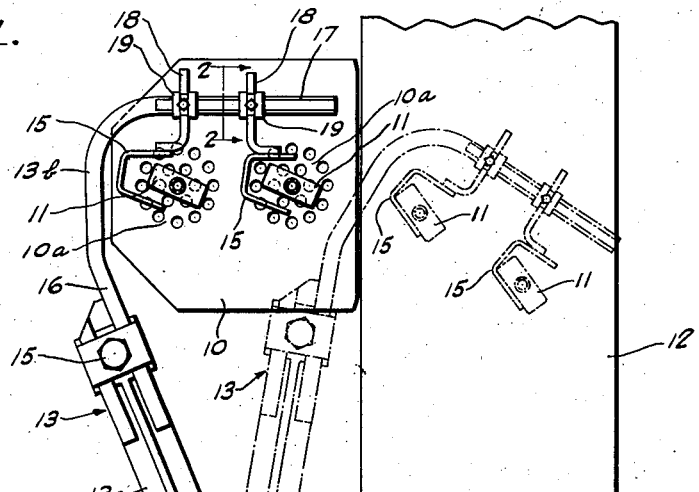
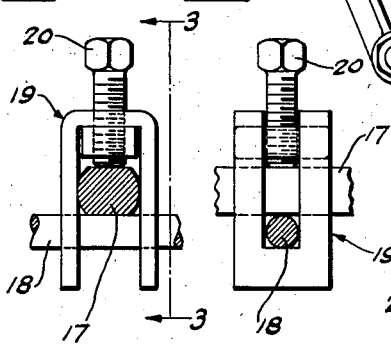
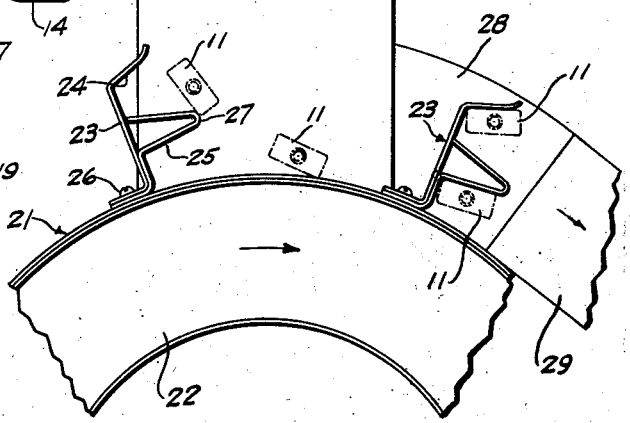
Witness:
B. X. Bartman
Inventor
Walter K. Berthold.
by Bynum & Parham
Attorneys Patented Aug. 1, 1944

2,355,036

UNITED STATES PATENT OFFICE 2,355,036

GLASSWARE TRANSFERRING AND CONVEYING APPARATUS

Walter K. Berthold, Rockville, Conn., assignor to Hartford-Empire Company, Hartford, Conn., a corporation of Delaware Application February 17, 1941, Serial No. 379,277

4 Claims. (Cl. 198—24)

This invention relates generally to apparatus for moving articles of glassware from a stationary receiving surface, such as a cooling dead plate adjacent to a glassware forming machine, to a conveyor and thence conducting the articles to a place at which they are to be stacked onto a lehr conveyor or otherwise disposed of.

An object of the present invention is to provide an improved apparatus of the character described for transferring and conveying a plurality of glass articles simultaneously.

A further object of the invention is to provide an apparatus of the character described having means for engaging a plurality of articles of glassware on a stationary supporting plate and for thereafter moving said articles and directing their movements in unison and relative to each other to dispose said articles on a moving delivery conveyor in relative positions which may be different from those occupied by the articles when they were on the stationary supporting surface.

A further object of the invention is to provide a mechanism of the character described which is of relatively simple construction and comprises but relatively few moving parts but is efficient and reliable in use and can be adjusted to handle at different times articles of different shapes and sizes or to take care of varying service conditions.

Other objects and advantages of the invention will hereinafter be pointed out or will become apparent from the following description of a practical embodiment of the invention, as shown in the accompanying drawing, in which:

Figure 1 is a fragmentary plan view of the improved glassware transferring and conveying apparatus;

Fig. 2 is a detail view, partly in section along the line 2—2 of Fig. 1 and mainly in elevation, showing a clamping device for securing the shank of a glass engaging pusher member to its supporting arm; and Fig. 3 is a view similar to Fig. 2 but illustrating the clamping device as it appears when viewed from a plane indicated by the vertical section line 3—3 of Fig. 2.

In Fig. 1, the numeral 10 designates a stationary supporting plate having apertured portions 10a onto which two similar articles of glassware 11 have been placed. This plate 10 may be a ware cooling dead plate adjacent to a glassware forming machine (not shown) in which the two articles 11 were formed concurrently and from which such articles may have been taken simultaneously and placed on the plate 10 by a suitable takeout device (not shown). The articles 11 are shown as panel bottles which have been placed on the cooling dead plate so that their greatest horizontal dimensions lie in directions which are parallel with each other and are diagonal to the direction of movement of a horizontal belt conveyor 12. The latter is located adjacent to and at substantially the level of the plate 10.

A mechanism for transferring the articles 11 simultaneously from the plate 10 onto the conveyor 12 may comprise a horizontally oscillatory arm 13 having an elongate main or body section 13a supported at one end on an upright rock shaft 14 and having an outer end section 13b provided with a pair of similar article engaging pusher members 15. These, on oscillation of the arm 13 from the full line position of Fig. 1 to the dot-and-dash line position of the same view, will engage the respective articles 11 on the dead plate and will move them horizontally from the dead plate onto the conveyor 12 substantially to the positions shown.

The attaching portion of the section 13b may be slid longitudinally on the section 13a to adjust the overall length of the oscillatory arm 13. The sections of such arm then may be fastened rigidly together, as by a clamping device indicated at 15.

The section 13b, outwardly from its attaching portion 16, may have the form of a bent rod of substantially right angular shape. The outer end portion of this section, indicated at 17, may extend at an angle nearly but not quite a right angle with the attaching portion 16 and with the main section of the oscillatory arm, being turned across the plate 10 toward the adjacent conveyor 12.

Each of the article engaging pusher members 15 may have a shape substantially like that of a horizontally disposed wide mouthed hook and each is provided with an outturned attaching shank 18 that extends substantially at a right angle with the adjacent side of the hook shaped pusher member. Each attaching shank 18 may be disposed across the outer portion 17 of the section 13b of the oscillatory arm beneath the latter as best seen in Figs. 2 and 3. Such shank is fastened to the portion 17 of the oscillatory arm in individually adjusted position along the latter, as by a clamping device such as that shown in detail in Figs. 2 and 3 and indicated generally at 19 in the several views. The arrangement is such that a cap bolt 20 of the clamping device may be loosened to permit relative movement between the flattened portion 17 of the outer section of the oscillatory arm and shank 18 thereneath. Any desired adjustment within limits of the position of the pusher member 15 relative to the oscillatory arm can be effected by moving either the shank 18 longitudinally relative to the part 17 or moving the clamping device 19 and the pusher member and its shank as a unit longitudinally of the part 17 or by both such adjustments. Tightening of the cap bolt 20 will clamp the flattened part 17 and the underlying shank 18 firmly together in their adjusted positions.

The article receiving recesses within the hook shaped pusher members 15 may decrease in width rearwardly and at their narrowest rear portions may be of less width than the widest portion of the body of the article to be engaged by such members. The articles engaged by the hook shaped pusher members thus may be turned about their vertical axes by such engagements if required to dispose a narrow side of each article at the rear of the pusher recess.

The forward swinging movement of the arm 13 will move the articles 11 from the plate 10 onto the conveyor 12, as to the positions indicated in dot-and-dash lines in Fig. 1. These positions will permit return swinging movement of the arm 15 and of the two pusher members to their full line positions without the more rearwardly of the two articles on the conveyor obstructing the path of movement of the outer and more forwardly located pusher member 15.

The conveyor 12 may be moved continuously (or intermittently if desired) by any suitable mechanism. It is adapted and intended to bring the articles thereon to positions to be acted upon by a second transfer mechanism, indicated generally at 21.

This transfer mechanism may comprise a rotary carrier in the form of a plate or table 22 provided at its outer periphery with circumferentially spaced pushers 23. Each of these pushers 23 may have a pair of generally similar radially juxtaposed article receiving recesses, indicated at 24 and 25, respectively. As shown, the pusher 23 may be formed of two elongate rods or strips having end portions attached at 26 to the rotary member 22 at the periphery of the latter and suitably bent for cooperation with each other and with an adjacent portion of the periphery of the rotary member 22 to form the aforesaid article receiving recesses 24 and 25, each of which is open at its front. These recesses 24 and 25 may be generally similar in configuration, as viewed in plan, to the recesses in each of the pushers 15 of the previously described transfer mechanism. A common division wall or partition 27 between the two recesses of each pusher 23 is rearwardly and outwardly inclined at its outer side toward the back wall of the recess 24 and rearwardly and inwardly inclined at its inner side toward the back wall of the recess 25. The rotation of the transfer mechanism 21 in cooperation with the movement of the conveyor 12 will result in the more rearwardly of a pair of articles 11 on the conveyor coming into contact with the rearwardly and outwardly inclined side of the common division wall between the two cavities 24 and 25 and being guided thereby into the recess or cavity 24. On further movement of the rotary transfer mechanism 21 in the direction of the arrow, the more forwardly of a pair of the articles 11 will be guided by the periphery of the carrier 22 into the recess or cavity 25. The rotation of the carrier 22 will be effective to move the two articles engaged by the pusher 23 together from the far side of the conveyor 12 onto a stationary dead plate 28, as shown for two of the articles 11 and one of the pushers 23 at the lower right hand portion of Fig. 1. It will be noted that the articles 11 on the plate 28 are disposed in laterally aligned relation with each other on the dead plate with the corresponding transverse axes of the two articles substantially parallel. Further rotary movement of the carrier 22 of the transfer mechanism 21 in the direction of the arrow will result in the pushing of the two articles from the dead plate 28 onto a second conveyor 29, the articles being spotted onto this conveyor in desired relative positions, as in transversely aligned positions similar to those occupied by the articles on the dead plate 28. The conveyor 29 may be moved continuously (or intermittently, if desired) by any suitable mechanism and may be of such character and so located as to conduct the articles to a place at which they are to be stacked onto a lehr conveyor (not shown) or otherwise disposed of. The speed of movement of the conveyor 29 should be sufficient to cause the articles thereon to move ahead of the pusher 23 to clear the latter while it is over such conveyor. The conveyor 12, plate 28, and conveyor 29 preferably should be located at or about the same level.

The relatively moving parts of the apparatus may be controlled and actuated by suitably timed mechanisms to assure synchronized operations of these various parts and efficient transferring and conveying of successive pairs of the articles to be handled by such apparatus.

The invention is not limited to the exact details shown in the drawing and herein described as various changes therein and modifications thereof will readily occur to those skilled in the art.

I claim:

1. The combination with a stationary horizontal supporting surface on which a pair of articles of glassware may stand and a conveyor adjacent to one edge of said supporting surface at substantially the same level as said surface, of a mechanism for transferring said articles substantially simultaneously from the supporting surface onto the conveyor, said mechanism comprising an oscillatory arm pivotally mounted at one end for swinging movement at a predetermined level from a starting position across said supporting surface and partially across the conveyor and for return swinging movement at the same level to said starting position, the outer, free end portion of said oscillatory arm being bent in the direction of said conveyor, and a pair of pushers carried by said outer end portion of said arm in positions respectively to engage said articles on the stationary supporting surface and operable by said first named swinging movement of said arm to move said articles from said supporting surface onto said conveyor and by the return swinging movement of the arm to disengage said articles, each of said pushers comprising a substantially horizontal hook-shaped member having an article engaging recess open at the side nearest to said conveyor and a shank attached to said outer end portion of the oscillatory arm.

2. The combination with a stationary horizontal supporting surface on which a pair of articles of glassware may stand and a conveyor adjacent to one edge of said supporting surface at substantially the same level as said surface, of a mechanism for transferring said articles substantially simultaneously from the supporting surface onto the conveyor, said mechanism comprising an oscillatory arm pivotally mounted at one end for swinging movement at a predetermined level from a starting position across said supporting surface and partially across the conveyor and for return swinging movement at the same level to said starting position, the outer, free end portion of said oscillatory arm being bent in the direction of said conveyor, a pair of pushers, each comprising a substantially hook-shaped article-engaging member open at the side thereof next to the conveyor and an attaching shank, and means for fastening the shanks of said pushers to the outer end portion of said oscillatory arm, such fastening means being constructed to permit adjustment of the hook shaped member of each pusher bodily toward or away from the portion of the oscillatory arm to which the shank of that pusher is fastened and independent adjustment of the pusher as a unit longitudinally of the same portion of the oscillatory arm.

3. The combination with a stationary horizontal supporting surface on which a pair of articles of glassware may stand, and a conveyor adjacent to one edge of said supporting surface at substantially the same level as said surface, of a mechanism for transferring said articles substantially simultaneously from the supporting surface onto the conveyor, said mechanism comprising an oscillatory arm mounted for swinging movement across said supporting surface to the conveyor and for return swinging movement, said oscillatory arm comprising a substantially straight main section pivotally supported at one end on a vertical pivot element and a bent rod-like supplemental section of substantially right angular shape adjustably fastened at one of its end portions to said main section so that its free, outer end portion is turned toward said conveyor, a pair of pushers, each comprising a substantially hook-shaped article-engaging member open at the side thereof next to the conveyor and an attaching shank, and means for fastening the shanks of said pushers to the outer end portion of said oscillatory arm, such fastening means being constructed to permit adjustment of the hook-shaped member toward or away from the outer end portion of the oscillatory arm and independent adjustment of the pusher member longitudinally of the outer end portion of the oscillatory arm.

4. The combination with a stationary horizontal supporting surface and a substantially horizontal conveyor adjacent to one edge of said stationary supporting surface at substantially the same level as the latter, of a mechanism for transferring a pair of articles of glassware substantially simultaneously from said stationary supporting surface onto said conveyor, said mechanism comprising an oscillatory arm of generally right-angular longitudinal shape and comprising a substantially straight horizontal portion pivoted at one end to swing about a vertical axis and a laterally turned free, outer end portion disposed above said stationary support with the outer end thereof turned toward said conveyor, the arrangement being such that oscillatory movements of said pivoted arm about its said axis will move said free end portion of the arm horizontally back and forth at a substantially constant level between said position over the stationary supporting surface and a position at which said free end portion of the arm extends diagonally across the conveyor with the free end thereof turned in the direction of movement of said conveyor, and a pair of spaced article pushers carried by the free end portion of said oscillatory arm for movement therewith to push a pair of spaced articles of glassware, one in advance of the other, from said stationary supporting surface onto said conveyor when said oscillatory arm swings from its first to its second named position and to swing clear of both of said articles on the conveyor during the return swinging movement of said arm.

WALTER K. BERTHOLD.